(No Model.)　　　　　　　　　　　　　　　　　3 Sheets—Sheet 1.
J. KAMPF.
HEATER FOR SOLDERING IRONS.

No. 499,362.　　　　　　　　　　Patented June 13, 1893.

WITNESSES:
Charles Schroeder
William Duehm

INVENTOR
J. Kampf
BY Guipel & Peugener
ATTORNEYS.

(No Model.)  3 Sheets—Sheet 2.

J. KAMPF.
HEATER FOR SOLDERING IRONS.

No. 499,362.  Patented June 13, 1893.

WITNESSES:
Charles Schroeder
William Duehm

INVENTOR
J. Kampf
BY Goppel & Raegener
ATTORNEYS.

(No Model.)
3 Sheets—Sheet 3.
J. KAMPF.
HEATER FOR SOLDERING IRONS.
No. 499,362.
Patented June 13, 1893.
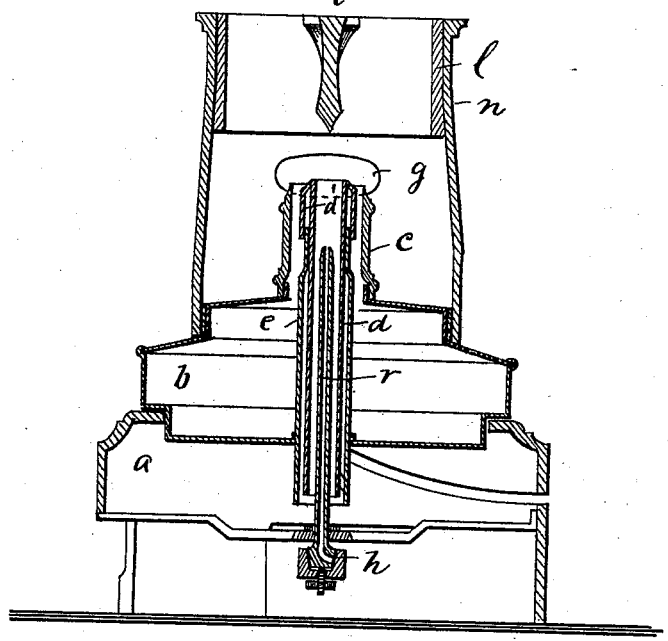
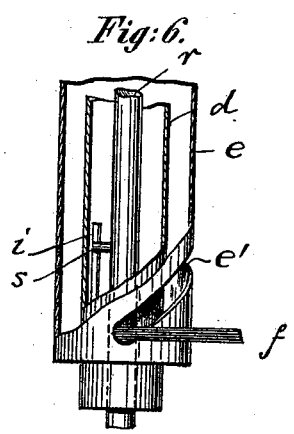
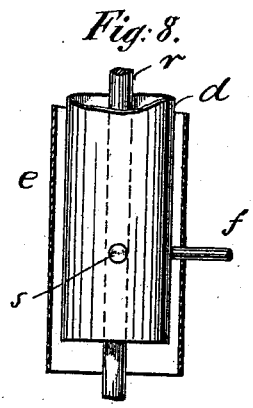
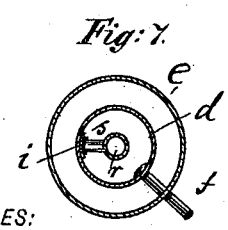
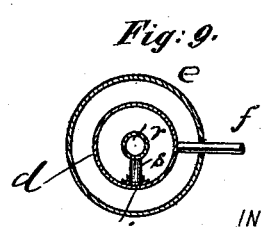
WITNESSES:
Charles Schroeder
William Duehm
INVENTOR
J. Kampf
BY
ATTORNEYS.

UNITED STATES PATENT OFFICE.

JOSEPH KAMPF, OF NEW YORK, N. Y.

HEATER FOR SOLDERING-IRONS.

SPECIFICATION forming part of Letters Patent No. 499,362, dated June 13, 1893.

Application filed July 28, 1892. Serial No. 441,453. (No model.) Patented in Switzerland October 2, 1891, No. 4,293.

*To all whom it may concern:*

Be it known that I, JOSEPH KAMPF, a subject of the Emperor of Germany, and a resident of the city, county, and State of New York, have invented certain new and useful Improvements in Heaters for Soldering-Irons, (for which I have obtained Letters Patent in Switzerland, No. 4,293, dated October 2, 1891,) of which the following is a specification.

This invention relates to an improved heater for soldering irons, which is heated with petroleum, and in which two soldering-irons can be heated either simultaneously or singly, as required, so that a heated soldering-iron is always ready for use.

The invention consists of a petroleum-heater for soldering irons, which comprises a fixed wick-tube and a movable wick-tube, the latter being arranged to turn on its axis, so as to expose a greater or smaller surface of the wick and thereby produce a larger or smaller flame. In the adjustable wick guide-tube is arranged an air-supply tube which turns on its axis with the vertical adjustment of the wick-tube and opens and closes thereby the air-supply cock. The adjustment of the wick-tube and air-supply tube is produced by means of an arm that is guided in a spiral slot of a sleeve that surrounds the wick-tube and in a spiral slot of the supporting-frame of the heater. At the top of the supporting-frame is arranged an axially-turning holder for the soldering-irons which is provided with two openings that can be set axially into line with the flame, so that one soldering-iron can be always heated or which can be so turned that the soldering-bridge of the holder is set centrally over the flame, so that two soldering-irons can be heated at the same time, if desired.

Figure 1:
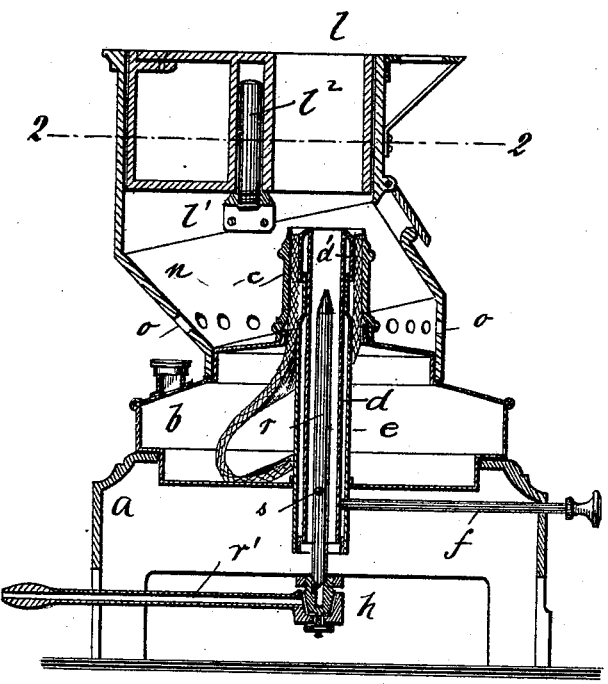
Figure 2:
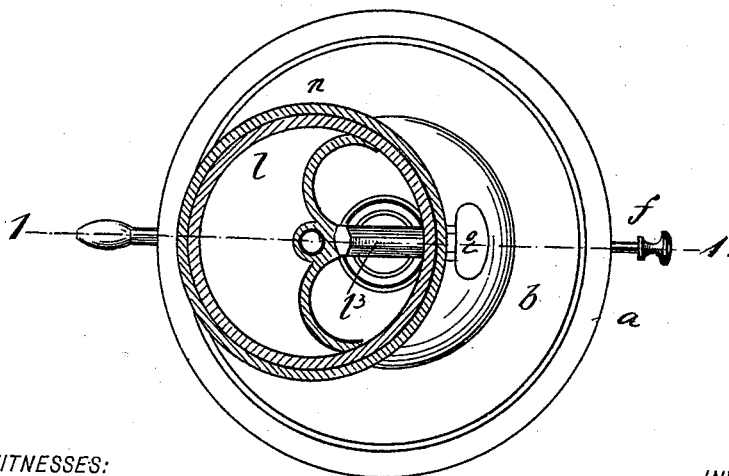
Figure 3:
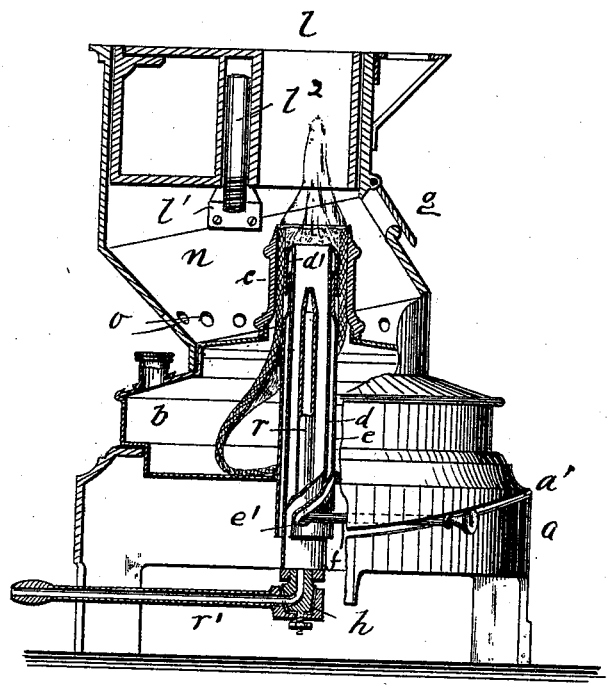
Figure 4:
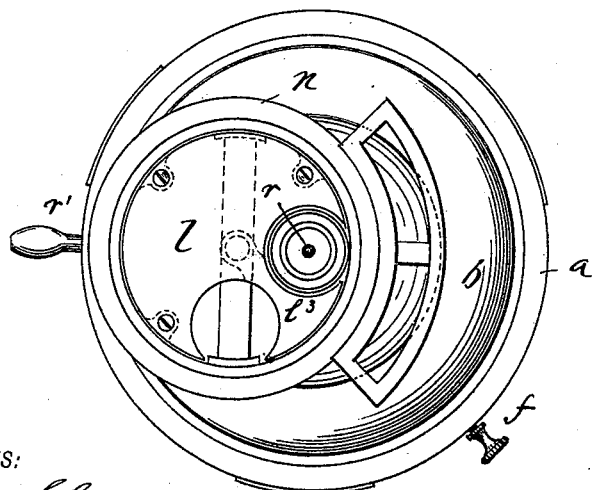

In the accompanying drawings, Figure 1 represents a vertical central section of my improved heater for soldering-irons, on line 1 1, Fig. 2, showing the wick-tube in raised position. Fig. 2 is a sectional-plan-view on the line 2 2, Fig. 1. Fig. 3 is a side-elevation partly in vertical central section, but showing the wick guide-tube in lowered position. Fig. 4 is a plan-view. Fig. 5 is a vertical transverse-section of the heater taken at right-angles to the sections shown in Figs. 1 and 3. Figs. 6, 7, 8 and 9 are details of the wick guiding-tube and the mechanism for adjusting the same higher or lower and for turning an air-supply tube.

Similar letters of reference indicate corresponding parts.

Referring to the drawings, $a$ represents the cylindrical supporting-frame of my improved heater for soldering-irons. On the base $a$ is supported the oil-fount $b$ which is fitted by a shoulder near its bottom-part into the base $a$. On the top of the oil-fount is arranged the fixed exterior wick-tube $c$, while the interior wick-tube $d$ extends centrally through the oil-fount $b$ and is vertically adjustable in the same. The interior wick-tube $d$ extends downward in a tube $e$ which forms part of the oil-fount. The interior wick-tube $d$ is provided at its upper part with a sleeve $d'$ which extends over the fixed tube $e$ so that the wick-tube $d$ is guided thereby in its upward and downward motions. If the interior wick-tube is set into raised position as shown in Figs. 1 and 5, the flame is correspondingly reduced, as the upper end of the wick is covered to a greater or less degree. If the interior wick tube is set into lower position, as shown in Fig. 3, the size of the flame is enlarged as a correspondingly larger surface of the wick is exposed. If the interior wick-tube is raised to its highest position the flame is extinguished, as the wick does not extend over the edge of the wick-tube $c$. The vertical adjustment of the interior wick-tube $d$ is accomplished by a horizontal arm $f$ which is attached to the same. For guiding the arm $f$ the guide-tube $e$ is provided with a spiral slot $e'$, while a spiral slot $a'$ is arranged in the base $a$, as shown clearly in Figs. 3, 5, and 6. The turning of the arm $f$ produces the axial turning of the interior wick-tube $d$ and the raising or lowering of the same as the arm is guided in the spiral slots of the guide-tube $e$ and the base $a$, so that, as before mentioned, a larger or smaller flame or the extinction of the same is produced.

At the interior of the inner wick-tube $d$ is arranged a central air-supply tube $r$ which is connected by a tube with a fan or other suitable air-forcing device, so that by the admission of air under pressure to the center of the flame a very intense heat is produced. The lower end of the air-supply tube $r$ is supported in a socket of the horizontal air-tube $r'$, the lower end of the air-tube $r$ forming with the socket of the tube $r'$ a cock $h$ which is opened or closed, according as the tube $r$ is turned on its axis, so that the openings at its lower end correspond with the air-supply tube $r'$ which is placed sidewise and out of register with the same. When the interior wick-tube $d$ is raised by the turning of the arm $f$ the stop-cock $h$ is set simultaneously in closed position.

The air-supply tube $r$ is provided with a pin $s$ which is guided in a groove $i$ formed by means of parallel strips at the inside of the interior wick-tube $d$. The pin $s$ and groove $i$ serve for the purpose of permitting the axial turning of the air-supply tube $r$ and at the same time prevent the raising or lowering of the same with the up and down motion of the interior of the wick-tube $d$.

On the oil-fount $b$ is supported a tubular casing $n$ which is provided with openings $o$ that are arranged around the burner formed by the wick-tubes, so that the air is freely supplied to the flame. At one side of the tubular casing $n$ is arranged an opening provided with a hinged lid $g$ through which opening the igniting of the flame can be accomplished. When the upper end of the wick is gradually consumed by use, the casing $n$ is removed, so that access is given to the upper end of the burner, so that the upper end of the wick can be readily trimmed or cut off in the usual manner. At the top-part of the tubular extension is arranged a bridge $l'$ which is provided with a vertical pin $l^2$, on which the central sleeve of the holder or support $l$ for the soldering-irons is placed. The upper part of the holder $l$ is made of cylindrical shape and guided in the surrounding upper part of the casing $n$. It is closed at the top which is provided with two adjacent openings into which the soldering-irons are inserted. The openings are separated by a bridge $l^3$. If the bridge is placed over the center of the heating flame, both soldering-irons can be heated at the same time by the flame, while if only one soldering-iron is to be heated, the holder $l$ is turned on its axis until the axis of the soldering-iron is in line with the axis of the flame, so that the soldering-iron is vertically above the flame and is heated directly thereby.

Having thus described my invention, I claim as new and desire to secure by Letters Patent—

1. The combination, of an oil-fount having a fixed exterior wick-tube and a central guide-tube, an interior wick-tube, a central air-supply tube in the interior wick-tube, and means for raising or lowering the interior wick-tube simultaneously with turning the air-supply tube on its axis, substantially as set forth.

2. The combination, with an oil-fount having a fixed exterior wick-tube and a fixed guide-tube, of an interior wick-tube, and air-supply tube that is located centrally in the interior wick-tube, a stop-cock arranged at the lower end of said air-supply tube, a horizontal air-supply tube communicating with the lower end of the vertical air-tube, and means for raising and lowering the interior wick-tube and simultaneously turning the vertical air-supply tube, substantially as set forth.

3. The combination, of an oil-fount having a fixed exterior wick-tube and a fixed central guide-tube, an interior wick-tube guided on said guide-tube, an air-supply tube at the center of the interior wick-tube, said air-supply tube being provided with a pin that is vertically guided in a longitudinal groove of the interior wick-tube, and an arm attached to the interior wick-tube and guided in spiral slots of the guide-tube of the oil-fount and of the supporting-base of the same, substantially as set forth.

In testimony that I claim the foregoing as my invention I have signed my name in presence of two subscribing witnesses.

JOSEPH KAMPF.

Witnesses:
  PAUL GOEPEL,
  CHARLES SCHROEDER.